US010746537B2

(12) United States Patent
Olszak (10) Patent No.: US 10,746,537 B2
(45) Date of Patent: Aug. 18, 2020

(54) RADIUS-OF-CURVATURE MEASUREMENT BY SPECTRALLY-CONTROLLED INTERFEROMETRY

(71) Applicant: APRE INSTRUMENTS, LLC, Tucson, AZ (US)

(72) Inventor: Artur Olszak, Tucson, AZ (US)

(73) Assignee: APRE INSTRUMENTS, INC., Tucson, AZ (US)

( * ) Notice: Subject to any disclaimer, the term of this patent is extended or adjusted under 35 U.S.C. 154(b) by 0 days.

(21) Appl. No.: 15/959,333

(22) Filed: Apr. 23, 2018

(65) Prior Publication Data

US 2018/0306575 A1  Oct. 25, 2018

Related U.S. Application Data

(60) Provisional application No. 62/490,029, filed on Apr. 26, 2017, provisional application No. 62/489,008, filed on Apr. 24, 2017.

(51) Int. Cl.

| | |
|---|---|
| *G01B 11/24* | (2006.01) |
| *G01J 9/02* | (2006.01) |
| *G01B 9/02* | (2006.01) |
| *G01B 11/255* | (2006.01) |
| *G01M 11/02* | (2006.01) |

(52) U.S. Cl.
CPC ...... *G01B 11/2441* (2013.01); *G01B 9/02004* (2013.01); *G01B 9/0209* (2013.01); *G01B 11/255* (2013.01); *G01J 9/02* (2013.01); *G01M 11/025* (2013.01); *G01M 11/0271* (2013.01); *G01J 2009/0253* (2013.01)

(58) Field of Classification Search
CPC ............ G01B 9/02002; G01B 9/02004; G01B 9/02042; G01B 9/0209; G01B 11/2441; G01B 11/255; G01M 11/025; G01M 11/0271; G01J 2009/0253
See application file for complete search history.

(56) References Cited

U.S. PATENT DOCUMENTS

| | | | |
|---|---|---|---|
| 6,894,788 B2 * | 5/2005 | Deck | G01B 11/2441 356/513 |
| 8,422,026 B2 | 4/2013 | Olszak | |
| 8,675,205 B2 | 3/2014 | Olszak | |
| 8,810,884 B1 | 8/2014 | Olszak | |
| 9,581,428 B2 | 2/2017 | Olszak | |
| 9,581,437 B2 | 2/2017 | Smythe et al. | |
| 9,618,320 B2 | 4/2017 | Olszak | |

(Continued)

*Primary Examiner* — Michael A Lyons
(74) *Attorney, Agent, or Firm* — Antonio R. Durando (57) ABSTRACT

The ROC value of a test surface is measured with a single spectrally-controlled interferometric measurement using a reference source of known ROC. The test surface is placed at the confocal position of the reference surface and the light source is modulated so as to produce localized interference fringes at the location of the test surface. The interference fringes are then processed with conventional interferometric analysis tools to establish the exact position of the test surface in relation to the reference surface, thereby determining the distance between the test surface and the reference surface. The radius of curvature of the test surface is obtained simply by subtracting such distance from the known radius of curvature of the reference surface.

11 Claims, 6 Drawing Sheets

(56) References Cited

U.S. PATENT DOCUMENTS

| | | |
|---|---|---|
| 9,696,211 B2 | 7/2017 | Olszak |
| 9,857,169 B1 * | 1/2018 | North Morris ...... G01B 11/255 |
| 2007/0171425 A1 * | 7/2007 | De Groot ............ G03F 7/70775 |
| | | 356/478 |
| 2016/0091299 A1 * | 3/2016 | Smythe .............. G01B 11/2441 |
| | | 356/489 |

* cited by examiner

PLACING THE TEST SURFACE AT THE CONFOCAL POSITION OF THE
REFERENCE SURFACE OF AN SCI INTERFEROMETER

MODULATING THE LIGHT SOURCE SO AS TO PRODUCE MULTIPLE
LOCALIZED INTERFERENCE FRINGES AT THE CONFOCAL POSITION OF THE
REFERENCE SURFACE

PROCESSING THE MULTIPLE LOCALIZED INTERFERENCE FRINGES TO
ESTABLISH THE EXACT POSITION OF THE TEST SURFACE IN RELATION TO
THE REFERENCE SURFACE

OBTAINING THE RADIUS OF CURVATURE OF THE TEST SURFACE BY
SUBTRACTING THE DISTANCE BETWEEN THE TEST SURFACE AND THE
REFERENCE SURFACE FROM THE KNOWN RADIUS OF CURVATURE OF THE
REFERENCE SURFACE

FIG. 8

RADIUS-OF-CURVATURE MEASUREMENT BY SPECTRALLY-CONTROLLED INTERFEROMETRY

RELATED APPLICATIONS

This application is based on and claims the priority of U.S. Provisional Application Ser. No. 62/490,029, filed Apr. 26, 2017, and of U.S. Provisional Application Ser. No. 62/489,008, filed Apr. 24, 2017, both hereby incorporated by reference.

BACKGROUND OF THE INVENTION

Field of the Invention

The invention relates generally to interferometry. In particular, it relates to a method for measuring the radius of curvature of a lens utilizing a spectrally-controlled interferometer in a single-step procedure.

Description of the Related Art

The radius of curvature (ROC) measurement represents one of the fundamental parameters of optical-element quality control. When using an interferometer, the conventional radius-of-curvature determination requires taking two measurements of the test article placed at different positions along the optical axis of the instrument. These positions, referred to in the art as "cateye" and "confocal," correspond to the locations where the returning beam producing the interference pattern at the camera of the interferometer reflects back at the same angle as the incident beam on the article. Under such conditions the pattern is substantially a single fringe, the so-called "null" fringe. The "null" fringe is produced at both the "cateye" and the "confocal" positions. At the cateye position, the beam comes to focus at the surface of the test article, so that the light incident on the surface reflects back with the same cone angle as the incident beam. At the confocal position, the radius of curvature of the test article matches the radius of curvature of the incident test beam, so that the incident beam normal to the surface reflects directly back on itself.

Figure 1:
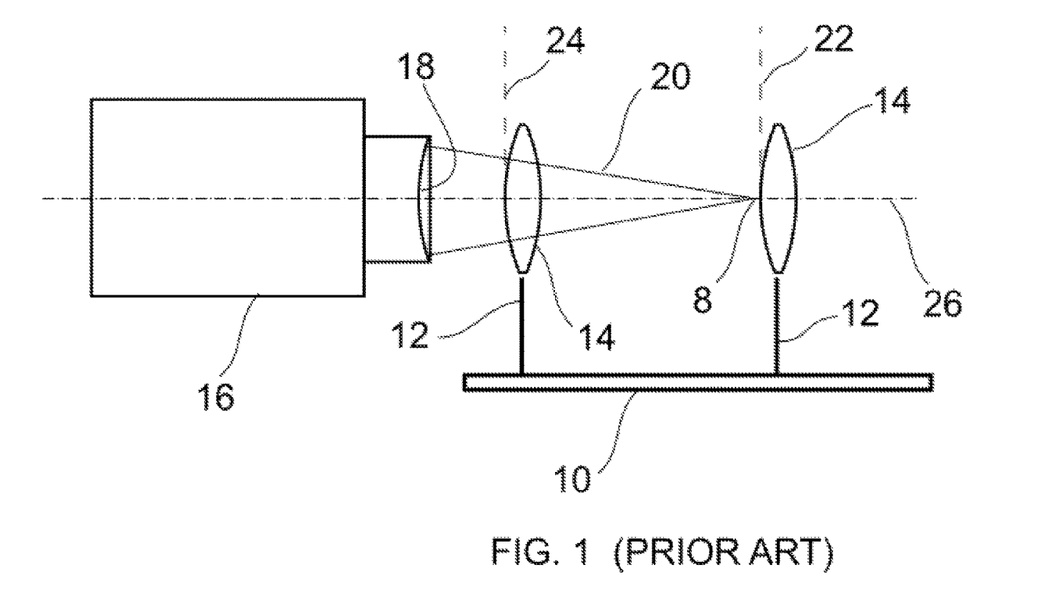
FIG. 1 illustrates a typical set-up for the interferometric measurement of the cateye and confocal positions of a curved test article for determining its radius of curvature.

The radius of curvature of a curved optical element such as a lens amounts to the difference along the optical axis between the cateye and confocal positions. Thus, the conventional method of measuring the ROC involves several steps of moving the lens from the confocal to the cateye position and back, and it relies on the accuracy of the mechanical supports to provide correct distance measurements. Therefore, the procedure is labor intensive and error prone. As illustrated in FIG. 1, a typical setup requires an optical bench 10 with a movable support 12 for holding a test lens 14 during the measurement; a means (not shown) for measuring distance along the bench 10, such as an encoder or a distance measuring interferometer coupled to the bench; an interferometer 16; and a reference sphere 18 adapted to project a converging wavefront 20. Initially, the test lens 14 is positioned at the focus of the interferometer's beam 20 (the cateye position 22) in order to remove any tilt present in the surface of the reference sphere 18. Next, the lens is moved to the confocal position 24 where the wavefront 20 is perpendicular to the surface of the lens 14. The exact position of the lens is then adjusted in x, y, and z by producing the null fringe and the distance between the nominal cateye and confocal positions read along a scale on the bench 10 is zeroed. Finally, the lens is moved back toward the cateye position 22 until the fringes are nulled again and the readout from the scale on the bench 10 is used as the ROC measure for the lens 14.

The most important source of errors in this setup is the error related to the fact that the optical bench 10 almost unavoidably introduces a tilt between the axis along the distance measured between the two lens positions and the optical axis 26 of the interferometer 16 (the so-called Abbe' error). In addition, temperature variations and other environmental changes cause other errors to occur as a result of the various sequential steps involved in the ROC measurement. Thus, the cost associated with the equipment required to measure relatively long distances with sufficient accuracy on an optical bench, as required for ROC measurements, can be substantial.

In view of the foregoing, one of the challenges with interferometric measurements of the radius of curvature of test articles, especially in high-throughput environments where the precision of the ROC is measured for production tolerance purposes, is to find a way to simplify the measurement into a procedure that requires only one step. This would eliminate most errors due to mechanical and environmental variations. U.S. Pat. No. 9,857,169 teaches a solution based on an internal path-matching assembly contained in the housing of the interferometer. This disclosure teaches a different solution based on spectrally controlled interferometry (SCI).

Spectrally controlled interferometry has been described in detail in several prior-art publications (see U.S. Pat. Nos. 8,422,026, 8,810,884 and 8,675,205, all hereby incorporated by reference). In essence, it is a technique based on the idea of forming localized fringes using an interferometer under unbalanced optical path difference (OPD) conditions. For example, by modulating the spectrum of the light source, it is possible to form such localized fringes and, by changing the modality of modulation, it is also possible to phase shift the fringes, which permits the use of modern fringe analysis methods to measure the test article. As such, in addition to practicing interferometry in WLI and conventional laser-interferometry modes with the described advantages, SCI allows the measurement of isolated surfaces, and enables the direct measurement of distance from the interferometer's reference surface.

The distribution and phase of the fringes produced by an interferometer is governed by the Wiener-Kinchin Theorem (see Born M, Wolf E., *Principles of optics: electromagnetic theory of propagation, interference and diffraction of light*, 7th Expand Ed., Cambridge, N.Y.: Cambridge University Press; 1999) and is expressed as the Fourier Transform of the spectral power distribution of the source. Through modulation of the source spectrum, it is possible to define the location and distribution of the interference fringes in space. For a source with mean wavelength $\lambda_0$, Equation 1 below expresses the distance of the location L of fringe formation (i.e., the peak of fringe contrast) from the reference surface as a function of the period of spectral modulation $\Delta\lambda$, $$L = \frac{\lambda_0^2}{2\Delta\lambda} \quad (1)$$

For example, to form fringes at the distance of 1 meter from the reference surface with a light source operating at a mean wavelength of 500 nm, the period of modulation needs to be 0.125 pm. This property is the basis for the methodology of this invention.

SUMMARY OF THE INVENTION

In general terms, the invention lies in the recognition that SCI can be used advantageously for the measurement of the radius of curvature of optics because it allows it to be carried out in a single step. By determining the period of spectral modulation $\Delta\lambda$ that produces the null fringe at the confocal position of the test optics, for example, its distance L from the reference surface becomes available from Equation 1, which in turn allows the straightforward calculation of the optics ROC if the reference ROC is known. This basic principle applies regardless of the SCI technique used to find the null fringe position in space. Furthermore, as is generally the case for SCI, any analysis technique used in the art for scanning white-light and phase-shifting interferometry is also available for this invention.

Thus, the ROC value of a test surface can be calculated from a single SCI measurement, which increases the throughput, eliminates the need for expensive distance measurement equipment, and removes a number of measurement error sources associated with conventional methods. The invention requires the use of an interferometer equipped a reference surface of known ROC and a light source capable of spectral modulation so as to produce a modulated beam with a temporal coherence such that interference fringes are detectable within the measurement space of the interferometer.

The process of the invention involves placing the test surface substantially at the confocal position of the reference surface and modulating the light source so as to produce localized interference fringes. Such localized interference fringes are then processed with conventional interferometric analysis tools to establish the exact position of the test surface in relation to the reference surface, thereby determining the distance between the test surface and the reference surface. The radius of curvature of the test surface is obtained simply by subtracting such distance from the known radius of curvature of the reference surface. The processing step may be carried out with any SCI methods, such as by scanning by phase shifting in a time-varying manner as a result of spectrum modulation. In all cases, the invention can be practiced with conventional interferometers equipped with a spectrally controllable source.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE INVENTION

As used in this disclosure, "white light" is intended to refer to any broadband light of the type used in the art of white-light interferometry (WLI), typically having a bandwidth in the order of many nanometers. WLI and CSI (coherence scanning interferometry) are used interchangeably. With reference to light in general, the terms "frequency" and "wavelength" are used alternatively, as commonly done in the art, because of their well-known inverse relationship. "Optical path difference" or "OPD" and "time delay" may be used alternatively because of their space/time relationship in interferometry. As normally done in the art with reference to interferometric apparatus, "optical path difference" and "OPD" are also used to refer to the difference between the lengths of the optical paths of the test and reference arms of the apparatus. Similarly, "sine" and "cosine," as well as related terms, are used alternatively unless specifically indicated otherwise. The terms "reference surface," "reference optic" and "reference sphere" are used alternatively, and it is understood that a sphere is normally used in the art for the measurement of ROC. Similarly, the terms "test surface," "measured surface," "test article," "test object" and "test lens" are all used to refer to the object that is the subject of a measurement. The term "single-step" and related terminology are used to refer to the steps of positioning the test object in the measurement instrument, not to the temporal acquisition of fringe signals for the purposes of the measurement. According to SCI principles, such sequential fringe signals can be acquired advantageously over time by modulating the source without physically scanning the test object.

The terms "modulate" and "modulation" are used in connection with a light source in the broadest sense to include any alteration of the frequency distribution, amplitude distribution or phase distribution of energy produced by the light source, and to also include the synthesis by any means of a light signal having a desired frequency, amplitude or phase distribution. When used in connection with interference fringes, the term "modulation" refers to the fringe envelope. In the case of spectrally-controlled or multiple-wavelength sources, "localized fringes" is intended to mean unambiguously identifiable fringe patterns formed at predetermined distances from the reference surface. Localized fringes are described as positioned at the surfaces from which they are produced to illustrate how they relate to those surfaces and surface shapes that produce them; however, it is understood that physically such localized fringes are only virtual fringes and that actual fringes are in fact formed only at the surface of the detector. Also, the phrase "producing localized fringes at a predetermined position in space" and related expressions are used for convenience, but it is understood that the precise intended meaning is "producing an interferometric environment whereby unambiguously identifiable fringe patterns are produced when a test surface is placed at a predetermined position in space" relative to a reference surface. The terms "fringes," "interference fringes," "fringe patterns" and "correlograms" are used interchangeably within the meaning normally accorded to them in the art. Finally, the generic term "interferometry" and related terms should be construed broadly as used in the art and not limited to shape measurements using an imaging interferometer. As such, interferometry is intended to include, without limitation, the measurement of changes in the position of an object, or of thickness of optical elements, using any known interferometric technique. The term "spectrally controllable light source" is intended to mean any light source capable of spectral modulation, whether the source is a single-component spectrally controllable source, such as currently available lasers capable of spectral modulation, or a multi-component source, such as a source that includes a broadband source and a modulator as separate components. Finally, as it relates to the confocal position of a test surface, the term "substantially" is intended to mean a position in the proximity of the exact confocal position such that resolvable fringes are visible; that is, a position where a measurement can be taken and used in conventional manner to establish the null-fringe (true confocal) position.

According to the present invention, the ability of SCI to localize interference fringes at a particular fringe-peak location provides a new ROC-measurement approach that circumvents the problems associated with conventional methods by limiting the procedure to a single direct measurement of the test surface. The precise value of the radius of curvature can be calculated directly from Equation 1 if the radius of curvature of the reference optic is known. Because the modulation period and the mean wavelength of the light are known values when practicing SCI, they can be used generally to calculate the exact distance of the test lens from the reference surface and, in particular according to the invention, when the test lens is at the confocal position of the reference surface. The difference between this value measured along the optical axis of the interferometer and the front focal length of the reference optic gives the desired value of ROC.

Figure 2:
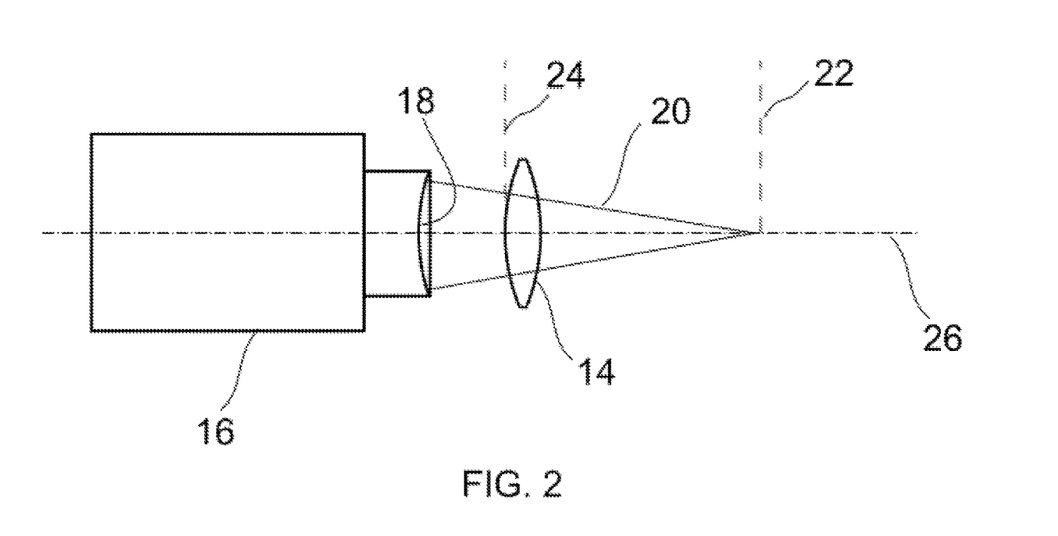
FIG. 2 is a schematic illustration of a set-up for the measurement of ROC with a single-step procedure according to the invention.

Referring to FIG. 2 (as a partial view of the set-up shown in FIG. 1), the measurement sequence of the invention can be described generally as follows. The test lens 14 is positioned at the confocal position 24 of the reference surface 18 (corresponding to a null fringe) mounted on an interferometric set-up equipped with an SCI source 16, as illustrated in FIG. 1. The SCI source is then modulated to produce maximum fringe contrast which, using Equation 1, yields all information require to establish with high accuracy the distance of the lens 14 from the reference surface 18. The difference between the ROC of the reference surface and such distance of the measured lens 14 will yield the ROC of the measured lens without any need to move the part to the cateye position 22 (see also FIG. 1), thereby eliminating most of the measurement errors involved with conventional measurements (such as Abbe's error). It also does not require any means for measuring distance along the optical bench 10.

As SCI is currently practiced in the art, it is convenient in most cases to modulate the source spectrum using a sine function that produces a single location (other than the zero OPD condition) where fringes are visible. (See U.S. Pat. No. 8,422,026.) In this case the phase of the fringes is tied to the phase of the modulating signal. Equation 2 describes the interference pattern resulting from a sinusoidal modulation of the source spectrum, $$I(z, \lambda, \varphi) = 0.5 \left[ 1 + \cos\left(\frac{2\pi z}{\lambda_0} + \varphi\right) \right] \exp\left( \frac{-\Lambda\left(z - \frac{\lambda_0^2}{2\Delta\lambda}\right)^2}{\pi \lambda_0^2} \right) \quad (2)$$

where $\lambda_0$ is wavelength, z is the distance from the zero OPD point (in relation to the reference surface), $\Lambda$ is the total bandwidth of the source, and $\varphi$ is the phase of the spectral modulation. Thus, given a source with fixed, know bandwidth and mean wavelength, it is possible to determine the location of the test surface with respect to the reference surface by determining the wavelength modulation period required to produce fringes of the highest contrast. In addition, these equations show that the location L of the peak of fringe contrast and the period of the interference pattern depend both on the period of spectral modulation $\Delta\lambda$ and the mean wavelength $\lambda_0$ of the source. The phase of the fringes is similarly related to $\Delta\lambda$ and $\lambda_0$. Therefore, it is possible to change both the phase and location of the fringes also by adjusting the mean wavelength of the source. These fundamental properties of SCI provide the basis for many applications, including a solution to the problem addressed in this disclosure. Because spectral modulation allows the formation of localized fringes at a predefined distance from the reference surface, it is particularly well suited to perform simplified ROC measurements in a single measurement, a significant improvement over conventional multi-step methodology.

Figure 3:
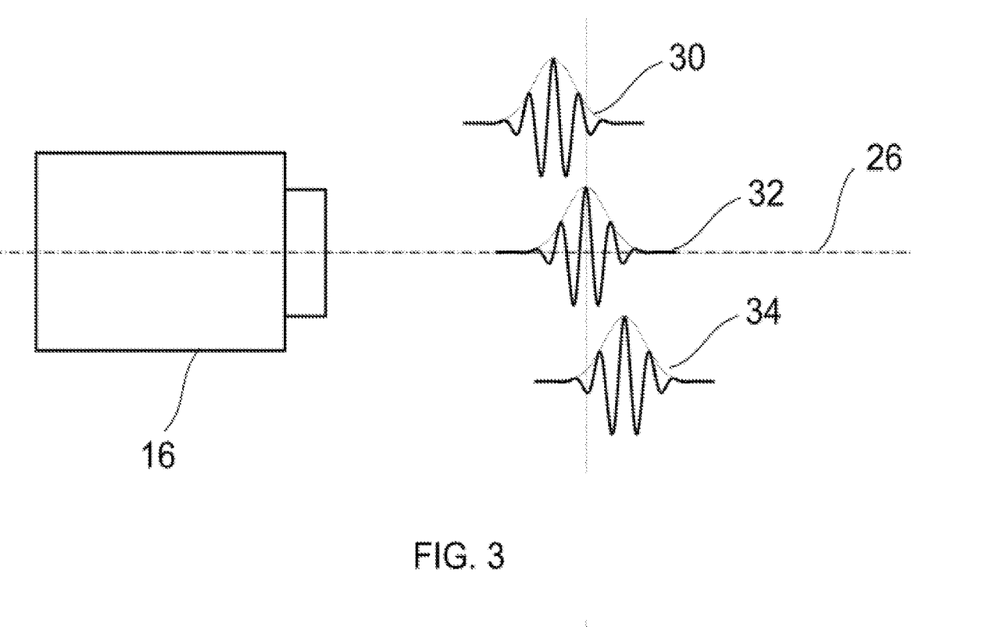
FIG. 3 illustrates three localized fringe envelopes shifted in space by varying the period of modulation according to SCI methodology for analysis with coherence scanning interferometry (CSI) techniques to determine the position of maximum contrast of the test object along the optical axis of the interferometer.
Figure 4:
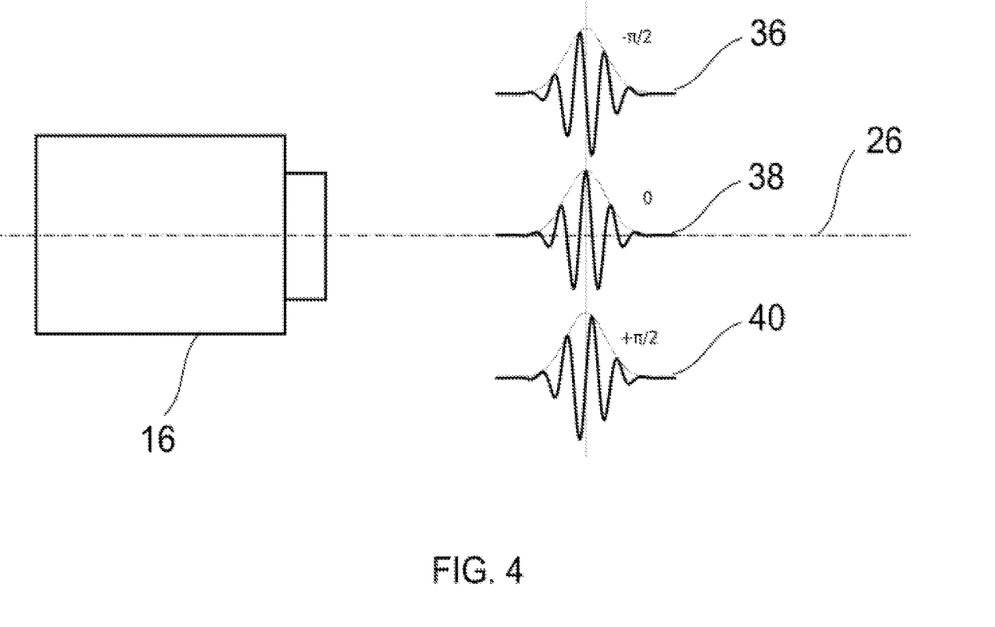
FIG. 4 illustrates three localized fringe envelopes shifted in phase by varying the phase of modulation according to SCI methodology for analysis with phase-shifting interferometry (PSI) techniques to determine the position of maximum contrast of the test object along the optical axis of the interferometer.

The location of the test article at the confocal position 24 is established by conventional analysis of the fringe images. For example, FIGS. 3 and 4 illustrate localized fringe envelopes generated for CSI and PSI analysis, respectively. Because the fringe images are periodic in nature, while PSI analysis produces highly accurate relative measurements of the test surface profile, it is sometimes hard to establish the exact position of the test surface in space. Therefore, fringe order disambiguation may be required, which can be done in combination with conventional white light interferometry (WLI) methods by scanning the location of the coherence envelope, such as taught in U.S. Pat. No. 6,059,925 (High-Definition Vertical-Scan Interferometry). This approach involves taking a series of fringe images of the test surface as the location of the envelope and/or the phase of the fringes is changed by modulating the spectrum emitted by the source 16.

A critical element of the invention is the knowledge of the exact ROC of the reference surface. This can be established by conventional measurement methods with an optical bench where the reference surface is treated as a test lens. Alternatively, it can be measured using the reference surface as such in an SCI set-up by placing a return surface at the cateye position and measuring the distance of the fringe contrast peak to the reference surface (again, simply using Equation 1). This calibration operation needs to be performed only once for each reference sphere and it does not need to be repeated for each measurement.

As mentioned, the exact confocal position of the test surface relative to the reference surface of the interferometer can be determined in several manners using proven SCI approaches. As illustrated in FIG. 3, for example, three localized fringe envelopes 30,32,34 (or more), shifted in space, can be produced by modulating the source according to SCI principles by changing the period of modulation in sinusoidal fashion. This information enables the determination of the location corresponding to maximum fringe contrast using conventional white-light methods. Similarly, FIG. 4 illustrates three localized fringe patterns 36,38,40 (more could be used) phase shifted by changing the phase of modulation of the source in sinusoidal fashion according to SCI principles to enable the more precise determination of the location corresponding to maximum fringe contrast using conventional phase-shifting methods. If necessary, the correct fringe order can be established by conventional methods, as mentioned above. The exact position of the test surface relative to the reference surface can then be calculated with Equation 1 based on the mean wavelength and the period of modulation corresponding to the fringe peak.

Figure 5:
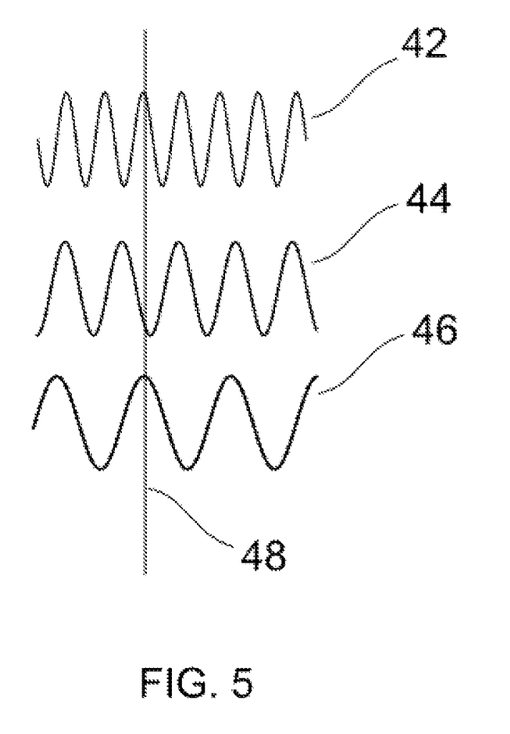
FIG. 5 illustrates in a very magnified view the effect of phase difference between localized fringes near the peak of the fringe envelope created by varying the mean wavelength of the modulated source.

Because, as explained above, it is also possible to change both the phase and location of the fringes produced by SCI by adjusting the mean wavelength of the source, another approach for the exact determination of the position of the test surface relative to the reference surface is based on using different parts of the spectrum of the source observed simultaneously. FIG. 5 illustrates three greatly magnified localized fringe patterns (correlograms) 42,44,46, each of them produced with a different mean wavelength created, for instance, by passing white light through respective filters, where the measured surface is represented symbolically by line 48. As a consequence of using different mean wavelengths, each correlogram has a different fringe period (from Equation 2). The intersection of the fringe intensity curves with the surface being measured shows that the phase of each correlogram changes at a different rate with reference to the position of the surface. The combination of the three phases is unique within a certain range of distances from the reference surface and it can be used to calculate the exact distance using the principle of operation of multiple wavelength interferometry.

Figure 6:
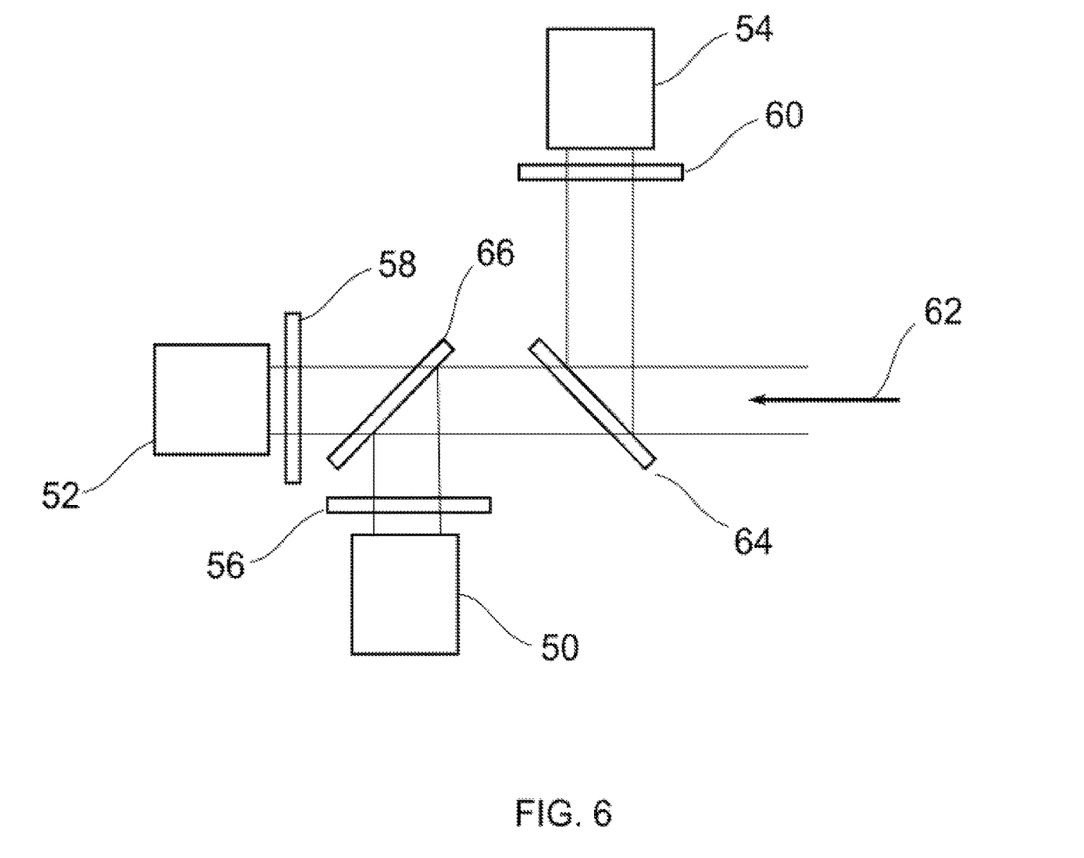
FIG. 6 shows a possible configuration for introducing mean-wavelength changes in the light source of an SCI instrument.
Figure 7:
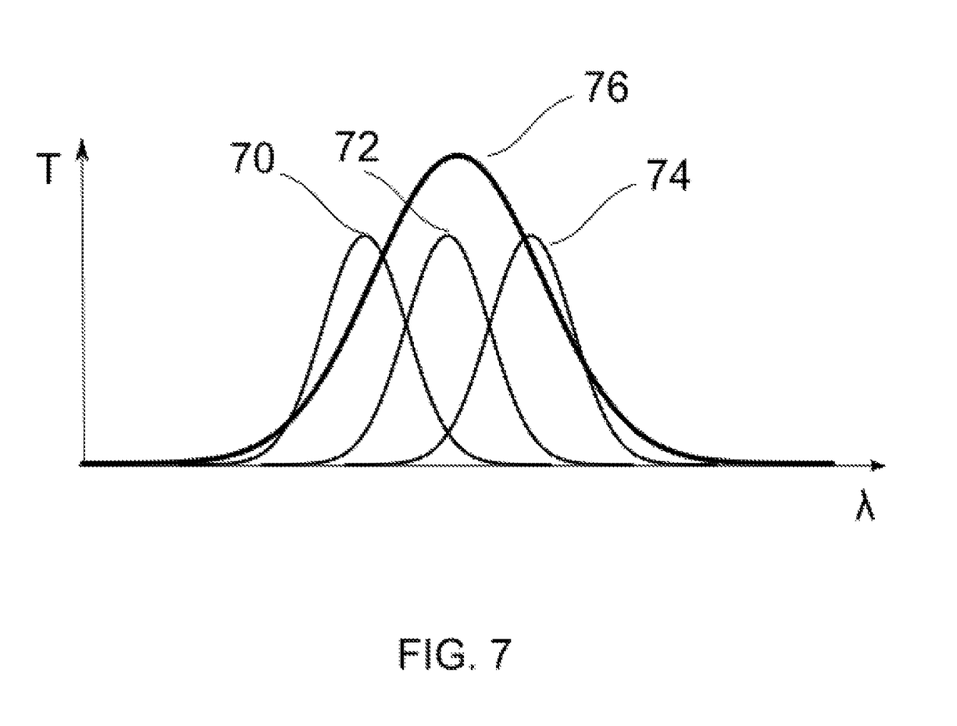
FIG. 7 illustrates the transmission curves T produced by three wavelength filters such as used in the set-up of FIG. 6 to produce simultaneously phase-shifted wavelength-dependent localized fringes.

Fringe patterns such as illustrated by 42,44,46 can share the same period of spectral modulation or have different periods of modulation. SCI's typical use of a broad bandwidth source affords a convenient way to build independent detection channels, each with a different mean wavelength. For example, as illustrated in FIG. 6, instead of the single camera used in conventional interferometers to register a series of images, a set of three cameras 50,52,54 (or more) can be used where each camera is equipped with a different filter in front of it (shown as elements 56,58,60, respectively). The incoming beam 62 is divided into three beams by two beam splitters 64 and 66 directed toward respective camera/filter combinations. The filters are selected to let only a part of the entire source spectrum through such that each camera sees the resulting spectrum with a different mean wavelength. An example of transmission curves from such filters is shown in FIG. 7, where the curves 70,72,74 correspond to the spectra transmitted by the three filters 56,58,60, respectively, and the curve 76 represents the overall spectrum of the source before modulation. By properly selecting the transmission curves T of these filters, it is possible to produce three simultaneous correlograms with the properties described above. This approach is described in detail in copending co-owned application Ser. No. 15/959, 006, entitled "Wavelength Shifting in Spectrally Controlled Interferometry."

Figure 8:
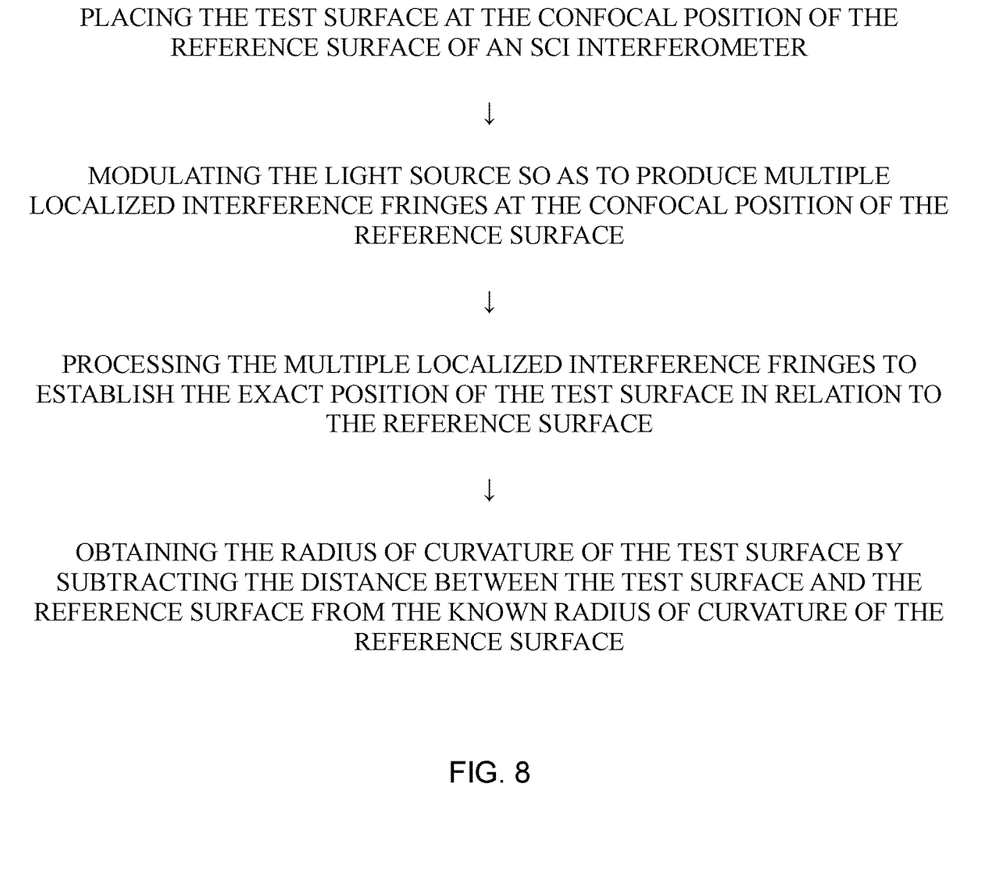
FIG. 8 is a flow-chart of the essential steps required for practicing the invention.

Thus, a simple approach has been described to measure the radius of curvature of a test surface with spectrally-controlled-interferometry apparatus when the ROC of the reference surface is known with precision. A single measurement of the test surface at the confocal null-fringe position of the reference surface is required, thereby rendering the procedure particularly advantageous for inline testing in a process for manufacturing copies of the same article. In each case, the ROC of the measured surface is readily obtained from the difference between the ROC of the reference surface and the position of the test surface as measured along the optical axis of the interferometer at the confocal point of the reference surface. FIG. 8 is a flow-chart outline of the critical steps involved in practicing the invention.

The invention has been shown and described herein in what is believed to be the most practical and preferred embodiments, but it is recognized that departures can be made therefrom. For example, the phase shift introduced by modulation to carry out the SCI measurement has been described with exemplary changes in the phase of modulation and in the mean wavelength of the source, all of which produce phase shifts in the localized fringes. However, it is understood that the invention could also be practiced with other changes in the modulation of the source's spectrum so long as the corresponding phase shifts in the resulting interferometric fringes are suitable for interferometric analysis. While these solutions represent the best way to illustrate the invention, it is possible that more complex solutions may be required for the optimal measurement of a particular sample or under particular testing conditions. Therefore, the invention is not to be limited to the disclosed details but is to be accorded the full scope of the claims to embrace any and all equivalent apparatus and methods.

The invention claimed is:

1. A method for measuring a radius of curvature of a test surface with a single confocal measurement, the method comprising the following steps:
   providing an interferometer with a broadband light source capable of spectral modulation to produce a light beam with a varying spectral distribution, said beam having a temporal coherence such that interference fringes are detectable within a measurement space of the interferometer, and said interferometer including a curved reference surface with a known radius of curvature;
   placing the test surface at a substantially confocal position of the reference surface;
   spectrally modulating the light source according to spectrally controlled interferometric principles so as to produce multiple localized correlograms at said confocal position of the reference surface;
   processing said multiple localized correlograms to establish an exact position of the test surface in relation to the reference surface, thereby determining a distance between the test surface and the reference surface; and
   obtaining said radius of curvature of the test surface by subtracting said distance from said known radius of curvature of the reference surface.

2. The method of claim 1, wherein said multiple localized correlograms are produced by changing a period of modulation of the light source.

3. The method of claim 1, wherein said multiple localized correlograms are produced by changing a phase of modulation of the light source.

4. The method of claim 1, wherein said multiple localized correlograms are produced by changing a mean wavelength of the light source.

5. The method of claim 1, wherein each of said multiple localized correlograms is produced by sinusoidal spectral modulation of the light source.

6. The method of claim 1, wherein said placing, modulating, processing and obtaining steps are repeated with successive test surfaces.

7. The method of claim 6, wherein said multiple localized correlograms are produced by changing a period of modulation of the light source.

8. The method of claim 6, wherein said multiple localized correlograms are produced by changing a phase of modulation of the light source.

9. The method of claim 6, wherein said multiple localized correlograms are produced by changing a mean wavelength of the light source.

10. The method of claim 6, wherein each of said multiple localized correlograms is produced by sinusoidal spectral modulation of the light source.

11. The method of claim 1, wherein said light source is adapted to produce multiple beams having different mean wavelengths to produce said multiple localized correlograms, and said processing step is carried out by applying multi-wavelength interferometric analysis to said multiple localized correlograms.

* * * * *